April 2, 1940. A. F. SANDERS 2,195,709

FUEL-INJECTION ENGINE

Filed April 17, 1939 2 Sheets-Sheet 1

Inventor
Arthur F. Sanders
by Mawhinney & Mawhinney
Attorneys.

April 2, 1940. A. F. SANDERS 2,195,709
FUEL-INJECTION ENGINE
Filed April 17, 1939 2 Sheets-Sheet 2

Inventor
Arthur F. Sanders
by Mawhinney & Mawhinney
Attorneys.

Patented Apr. 2, 1940

2,195,709

UNITED STATES PATENT OFFICE 2,195,709

FUEL-INJECTION ENGINE

Arthur Freeman Sanders, Leeds, England, assignor of one-half to John Fowler & Co. (Leeds) Limited, Leeds, England Application April 17, 1939, Serial No. 268,386
In Great Britain April 4, 1938

4 Claims. (Cl. 123—32)

This invention relates to fuel-injection engines, and particularly to such as operate by compression-ignition. The main object is to provide a compression space and injector arrangement of such form that satisfactory fuel penetration will be obtained in the case of relatively-low-compression-ratio engines, particularly when supercharged; so that very thorough mixing of the air and fuel will be effected at the end of the compression stroke, and a satisfactory proportion of the oxygen of the air will be completely burnt without excess fuel being used.

My U. S. Patents Nos. 2,089,577 and 2,096,527 describe a form of compression cavity with which very satisfactory results can be obtained with normal compression engines—that is, with engines of compression ratios of sixteen to one and upwards for a cylinder bore of from three to four-and-a-half inches, and compression ratios of fourteen to one for larger cylinder bores. The specifications describe how a swirl of charge in one sense is produced in the compression cavity and then towards the end of the compression stroke part or the whole of that swirl is arrested, producing turbulence, whilst there subsequently follows a swirl of continuous turbulence in the opposite sense to that of the original swirl.

In the case of such an engine operating with natural aspiration, if a lower compression-ratio is to be used, as is contemplated (for example, a compression-ratio below twelve to one), the less turbulence and the lower swirl velocities resulting will cause difficulties in obtaining complete combustion of the charge and in avoiding stained exhaust, leading to loss of power and increased fuel consumption. This is more marked still in the case of such an engine which is supercharged.

It is a particular object of mine to provide satisfactory combustion in the case of such a relatively-low-compression-ratio engine.

According to the invention the combustion space of the engine essentially consists of two or more compression cavities spaced from one another, and the engine has means for successively injecting fuel into some or all of the cavities (as by the timing of different fuel pumps, or by using fuel delivery pipes of different capacities and a single fuel pump), at least the cavity or cavities in which the later injection is effected being of the form disclosed in either of my patents aforesaid. Then on combustion ensuing in the cavity or cavities in which injection first takes place, say, at about twenty-five degrees actual before top dead centre, the consequent increase of gas pressure therein increases the final gas influx and the final turbulent swirl in the cavity or cavities in which injection next takes place, and the combustion in the latter is, in consequence, more completely consummated, leading to maximum pressures without knock or detonation effects. Moreover, the new pulse of pressure thus set up now reacts on the first cavity or cavities, checking and reversing the flow of partly-burnt charge therein, and assisting in consummating the combustion, particularly if the first cavity or cavities also be of the kind disclosed in my patents aforesaid.

In this way high mean effective pressures can be obtained without the exhaust becoming visible, and we are able to operate (without the use of doped fuels) with compression-ratios as low as about nine-to-one for small engines and about eight-to-one for larger.

In the case of an engine having only two such compression cavities per cylinder, these are preferably arranged so that the line joining the centres thereof is a diametrical one of the cylinder, and the inlet and exhaust valves are preferably arranged with their centre lines intersecting a diameter of the cylinder bore which is at right-angles to the said diametrical one.

In the case of an engine having for each cylinder four of such compression cavities, symmetrically arranged round the cylinder bore, provision may be made for injecting fuel simultaneously into one diametrically-opposite pair of cavities at a different timing from the simultaneous injection into the other pair. If desired the cavities need not be of the same size. In that case a smaller cavity preferably has the fuel injected thereinto before a larger, the former acting as an activator for the latter which, as above mentioned, is of the form disclosed in my patents aforesaid.

In the accompanying drawings—

Figure 1:
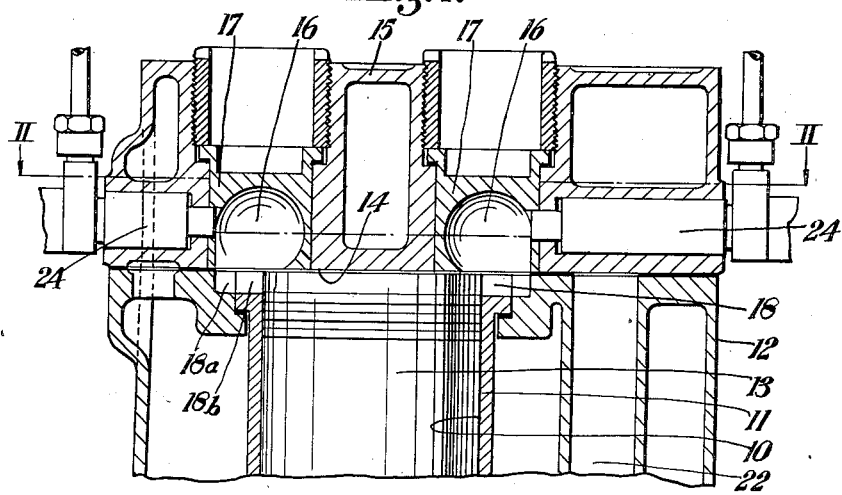
Figure 1 is a fragmentary sectional elevation of one form of Diesel engine arranged according to the invention, the section through the cylinder-head being taken mainly on the line I—IA, and that through the cylinder block mainly on the line I—IB, of Figure 2.
Figure 2:
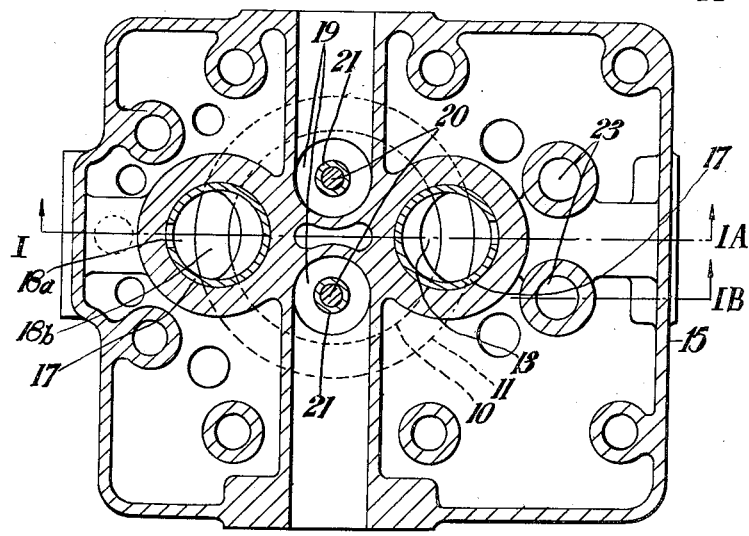
Figure 2 is a sectional plan taken mainly on the line II—II of Figure 1, the injector nozzles being omitted for the sake of simplicity.

In the construction of Figures 1 and 2, the cylinder bore 10 is constituted by a "wet" liner 11 carried by a cylinder casting 12, and in Figure 1 the piston 13 is shown at the top-dead-centre position, in which its flat head has approached the flat wall 14 on the underside of the cylinder-head 15 with a minimum of clearance such as is necessary for mechanical reasons. There are only two compression cavities 16 each of generally spherical shape and each arranged in the manner described in the specification above-mentioned. That is to say, the main portion of each is formed in a block 17 detachably carried in the cylinder-head, but each also includes a portion 18 lying below the level of the piston-head when the latter is at the top-dead-centre position—i. e., a portion 18a provided in the cylinder casting and a portion 18b provided in the flange of the liner. These two compression cavities are arranged to be diametrically-opposite one another, and in this instance the diameter on which their centres lie is at right-angles to a diameter passing through the centre lines of the inlet and exhaust valves 19. The stems 20 thereof are disposed in guides 21. The valves may be operated through rockers and push-rods in the known manner, the latter passing, respectively, along the passages 22, 23 provided in the cylinder casting and in the cylinder-head, respectively. The fuel is injected into the compression cavities by means of injection nozzles 24.

Figure 3:
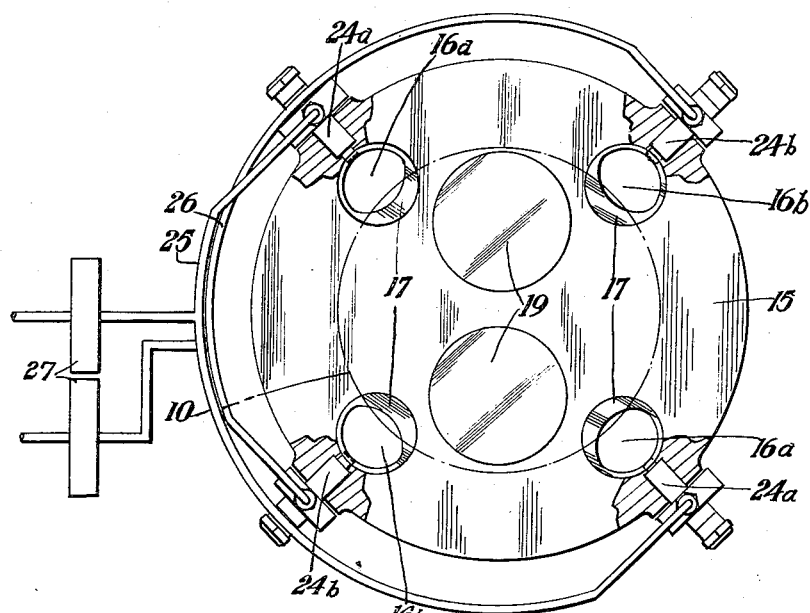
Figure 3 is a diagrammatic underside plan of another form of cylinder-head for a Diesel engine arranged according to the invention.

In the construction of Figure 3, there are four such compression cavities, 16a and 16b, arranged symmetrically round the cylinder bore. The main portion of each cavity is formed in a detachable block 17, as in the construction of Figures 1 and 2, all the cavities conforming with that of the specification aforesaid. Here again the inlet and exhaust valves 19 are disposed in the cylinder-head 15 with their centre lines lying on a diameter of the cylinder bore, and the four compression cavities are symmetrically arranged with respect thereto, the diametrically-opposite cavities 16a having their centres on a diameter which is at right-angles to that passing through the centres of the diametrically-opposite cavities 16b.

Fuel is injected into either or both cavities of a pair and the injections may be effected simultaneously or consecutively. For each cylinder, use may be made of a separate pump 27 for injecting fuel into each cavity, or of a single pump operating on a sprayer in each cavity. Consecutive injection may be obtained by the timing of separate fuel pumps, or use may be made of fuel delivery pipes of different capacities leading from a single pump.

In the example of Figure 3, the chain line 25 represents a source of fuel supply leading only to the injection nozzles 24a of the diametrically-opposite compression cavities 16a, the chain line 26 representing a source of fuel supply leading only to the fuel nozzles 24b for the diametrically-opposite compression cavities 16b, so that the latter nozzles may be supplied with fuel over a different range from that through which the former pair is supplied.

What I claim as my invention and desire to secure by Letters Patent of the United States is:

1. In a fuel injection engine, a cylinder, a piston adapted to reciprocate in the bore of said cylinder, a cylinder head having a pair of diametrically opposite compression chambers therein, the cylinder having at the top thereof removed portions providing downward extensions of said compression chambers, said compression chambers communicating by a relatively large opening of no axial length with the cylinder bore fuel injection means for one of said chambers, and fuel injection means for the second chamber timed to inject fuel consecutively with respect to injection in said one chamber in each engine cycle the firing of the mix in the first chamber increases turbulence and compression in the second chamber to effect optimum fuel combustion.

2. In a fuel-injection engine, a cylinder, a piston adapted to reciprocate in the bore of said cylinder, a cylinder head having a plurality of substantially spherical compression chambers therein symmetrically spaced around said cylinder bore and communicating directly therewith through an opening of substantially no axial length, said cylinder having at the top thereof removed portions providing downward extensions of the said compression cavities within the cylinder, said downward extensions of the compression chambers permitting entrance of the piston edges thereinto thereby causing increased turbulence and swirl of the air at the end of the compression stroke fuel injection means for one pair of chambers, and fuel injection means for a second pair of chambers timed to inject fuel consecutively with respect to injection in said one pair in each engine cycle the gases of combustion in the first-fired pair of chambers, fired before the piston is at top dead center, expand across the piston face to increase turbulence and pressure within the chambers to be fired thereby causing optimum fuel combustion.

3. In a fuel-injection engine, a cylinder, a piston adapted to reciprocate in the bore of said cylinder, a cylinder head having a flat inner wall, an inlet and exhaust valve in said flat wall disposed with their center lines on a diameter of the said cylinder bore, said cylinder head having a plurality of symmetrically spaced compression chambers disposed in diametrically-opposite pairs with respect to the cylinder bore, said compression chambers being substantially spherical with their centers approximately in line with the side wall of the cylinder, said cylinder having removed portions at the top thereof providing downward extensions of said chambers within the cylinder, said downward extensions forming relatively large openings of substantially no axial length between the chambers and the cylinder bore, fuel injection means for one pair of chambers, and individual fuel injection means for a second pair of chambers timed to cause consecutive fuel injection into the related pairs of chambers in each engine cycle.

4. In a fuel-injection engine, a cylinder, a piston adapted to reciprocate in the bore of said cylinder, a cylinder head having a flat inner wall, an inlet and exhaust valve in said wall disposed with their center lines on a diameter of the cylinder bore, said cylinder head having a pair of substantially spherical compression chambers therein disposed diametrically opposite with respect to the cylinder bore and on a diameter at right angles to the centre lines of said valves and offset from said bore, said cylinder having at the top thereof removed portions providing downward extensions of the chambers, said downward extensions forming relatively large openings between the chambers and the cylinder bore, individual fuel injection means for each of said chambers, and timing means for the fuel injection means adapted to cause consecutive fuel injection into the chambers in each engine cycle to fire the charges therein in successive order.

ARTHUR FREEMAN SANDERS.